United States Patent [19]

Sakai

[11] Patent Number: 4,639,848
[45] Date of Patent: Jan. 27, 1987

[54] METHOD AND SYSTEM FOR CONTROLLING AN AC-DC CONVERTER SYSTEM

[75] Inventor: Takami Sakai, Akishima, Japan

[73] Assignee: Kabushiki Kaisha Toshiba, Kawasaki, Japan

[21] Appl. No.: 736,781

[22] Filed: May 22, 1985

[30] Foreign Application Priority Data

May 24, 1984 [JP] Japan .................. 59-103614

[51] Int. Cl.[4] ............................... H02H 7/00
[52] U.S. Cl. ......................... 363/51; 363/35
[58] Field of Search ............... 363/35, 37, 50–51, 363/79; 361/88, 90, 92

[56] References Cited

U.S. PATENT DOCUMENTS

| | | | |
|---|---|---|---|
| 3,636,431 | 1/1972 | Machida et al. | 363/51 |
| 4,264,951 | 4/1981 | Konishi et al. | 363/35 |
| 4,475,150 | 10/1984 | D'Atre et al. | 363/51 |

FOREIGN PATENT DOCUMENTS 0087640 9/1983 European Pat. Off. .
16-13539 7/1941 Japan .

OTHER PUBLICATIONS

*Direct Current*, 18th Issue, vol. 3, No. 2, Sep. 1956, p. 55.

Primary Examiner—Peter S. Wong
Attorney, Agent, or Firm—Schwartz, Jeffery, Schwaab, Mack, Blumenthal & Evans

[57] ABSTRACT

In control of an AC-DC converter system including AC-DC converters (1A, 1B) having respective AC terminals connected to AC power systems (6A, 6B) and having respective DC terminals connected to each other, a fault in the AC power systems is detected, and upon occurrence of a fault in any of the AC power systems, the DC current of the AC-DC converter which is connected to the sound AC power system is adjusted in such a manner as to maintain the AC voltage of the AC-DC converter which is connected to the sound AC power system at a desired value.

7 Claims, 2 Drawing Figures

METHOD AND SYSTEM FOR CONTROLLING AN AC-DC CONVERTER SYSTEM

BACKGROUND OF THE INVENTION

The present invention relates to control over an AC-DC converter system provided in a DC power transmission system or in a frequency converting system, in which two AC power systems are coupled by an AC-DC converter system comprising a pair of converters and an intermediate DC line connecting the converters.

With conventional control systems for an AC-DC converter system the voltage of a healthy or sound AC power system is subject to variation when a fault occurs in another AC power system. The voltage variation is not too large when the healthy power system is strong, i.e., its short-circuit capacity is large relative to the capacity of the converter. But the voltage variation is substantial when the sound power system is weak. The voltage variation may become so large as to cause a breakdown of the system.

SUMMARY OF THE INVENTION

An object of the invention is to eliminate the adverse effect on the sound AC power system and make it possible to maintain safe operation of an AC-DC converting system.

Another object of the invention is to prevent over voltage or under voltage in the sound AC power system.

A further object of the invention is to provide a system in which the DC current of the converter is controlled to suppress variation in the voltage of the sound AC power system during the fault.

According to the invention, there are provided a method and a system for controlling an AC-DC converter system including AC-DC converter having respective AC terminals connected to AC power systems and having respective DC terminals connected to each other, in which a fault in the AC power systems is detected, and upon occurrence of a fault in any of the AC power systems, the DC current of the AC-DC converter which is connected to the sound AC power system is adjusted in such a manner as to maintain the AC voltage of the AC-DC converter which is connected to the sound AC power system at a desired value.

DETAILED DESCRIPTION OF THE PREFERRED EMBODIMENTS

Figure 1:
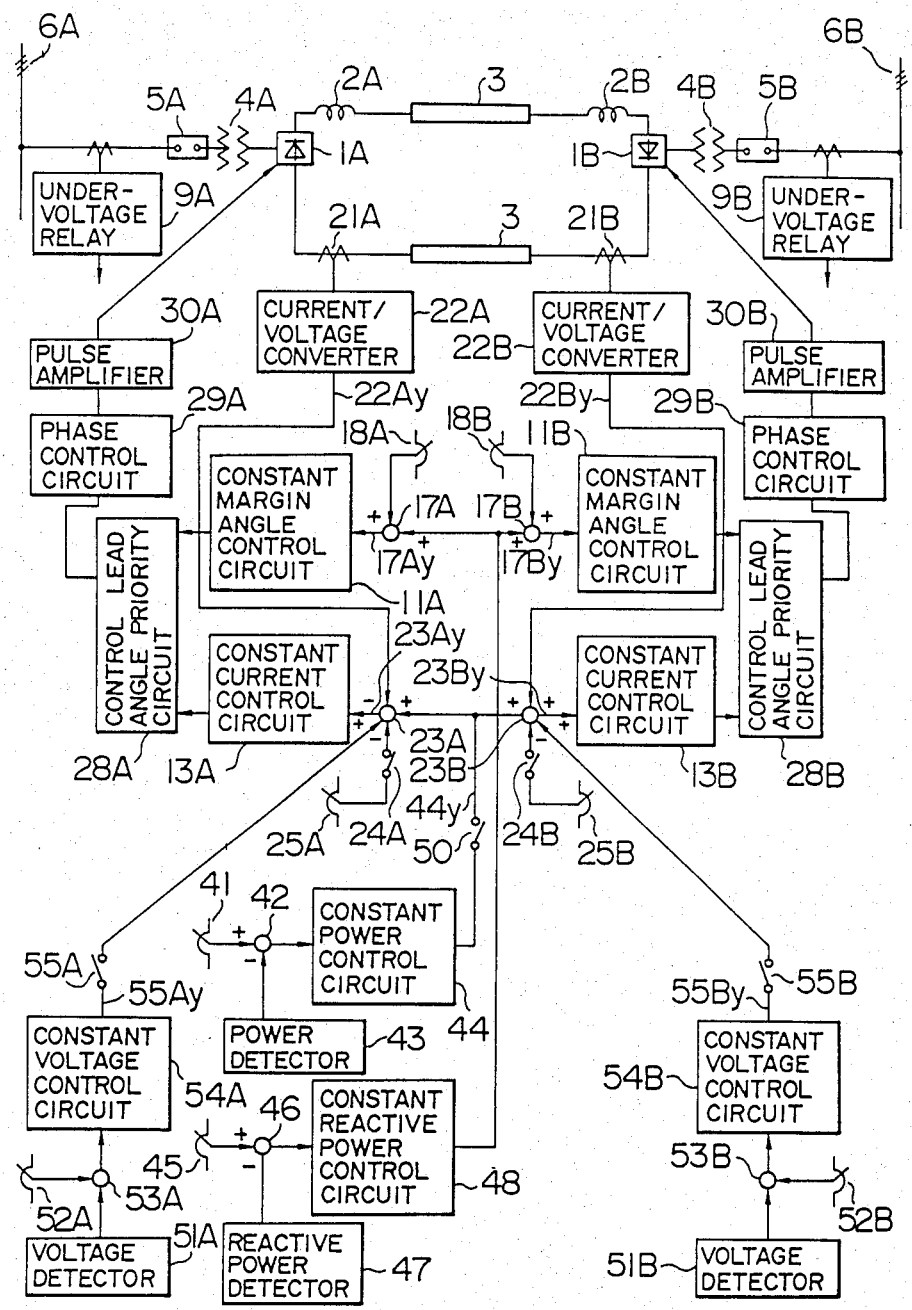
FIG. 1 is a block diagram showing a control system according to the invention.

FIG. 1 shows a control system according to this invention. The control system of this embodiment is used to control an AC-DC converter system in a DC power transmission system. The AC-DC converter system comprises a pair of AC-DC converters 1A, 1B whose DC terminals are connected via DC reactors 2A, 2B and through DC transmission line 3. The AC terminals of the converters 1A, 1B are respectively connected via transformers 4A, 4B, and circuit breakers 5A, 5B to AC power systems 6A, 6B.

The converters 1A, 1B are provided with constant margin angle control circuits 11A, 11B and constant current control circuits 13A, 13B. By the action of the constant margin angle control circuits 11A, 11B, the margin angles of the converters 1A, 1B are made to follow the respective margin angle reference values 17Ay, 17By from adders 17A, 17B adding minimum margin angle reference values from minimum margin angle setting devices 18A, 18B and outputs from constant reactive power control circuits 48 needed by the converter system. The DC currents through the DC transmission line 3 are detected by current detectors 21A, 21B and converted by current/voltage converters 22A, 22B into DC current detection signals 22Ay, 22By having a level suitable for control circuitry. The DC current detection signals 22Ay, 22By are respectively applied to adders 23A, 23B. When the AC power systems are both sound, a switch 50 is closed so that an output of a constant power control circuit 44 is applied through the switch 50 to the adder as a current reference value 44y.

The constant power control circuit 44 is provided to control the transmitted power interchanged between the AC power systems 6A, 6B. The power reference value determined by a power setting device 41 and a power detection value outputted by a power detector 43 detecting the transmitted power are inputted into an adder 42, which produces the difference between the two inputs. The difference is fed to the constant power control circuit 44, which is a control amplifier having for example P (proportional) I (integral) D (derivative) control function or PI control function, and its output is used as the current reference value.

The adders 23A, 23B determine the differences 23Ay, 23By between the DC current detection signals 22Ay, 22By and the current reference value 44y from a constant power control circuit 44. The differences 23Ay, 23By are supplied to constant current control circuits 13A, 13B, so that the DC currents through the transmission line 3 are made to follow the current reference value 44y.

With the above-described arrangement, the transmitted power is made to follow the power reference value.

Switches 24A, 24B are provided in association with the converters 1A, 1B and are closed when the associated converter is to operate as an inverter and is open when the associated converter is to operate as a rectifier. When the switch 24A or 24B is closed, the current margin from the associated current margin setting device 25A or 25B is inputted to the adder 23A or 23B.

A control lead angle priority circuit 28A receives the output of the constant margin angle control circuit 11A and the output of the constant current control circuit 13A, and selectively produces the output which corresponds to or designates a larger lead angle than the other. Similarly, a control lead angle priority circuit 28B receives the output of the constant margin angle control circuit 11B and the output of the constant current control circuit 13B, and selectively produces the output whose lead angle is larger than the other. As a result, by the function of the current margin and the control advance angle priority circuits 28A, 28B, when the switch 24B is closed and the switch 24A is open, the priority circuit 28A produces the output of the constant current control circuit 13A, and the priority circuit 28B produces the output of the constant margin angle control circuit 11B. In the following description, it will be assumed that the switch 24A is open and the switch 24B is closed for brevity of description.

The outputs of the priority circuits 28A, 28B are respectively inputted to phase control circuits 29A, 29B and are converted into pulse signals which determine the firing timing of the converters 1A, 1B. The pulse signals are amplified by pulse amplifiers 30A, 30B to become gate pulse signals which are actually fed to the converters 1A, 1B.

For the purposes of reactive power control, the converters may be regarded as a kind of lagging load whether they are operating as a rectifier or an inverter, and their power factor is, as is well known, approximately proportional to their control lag angle or control lead angle. In view of these, a reactive power reference value determined by a reactive power setting device 45, and a reactive power detection value outputted by a reactive power detector 47 are inputted into an adder 46 which determines the difference between the two inputs. The difference is fed to a constant reactive power control circuit 48 which is a control amplifier, and its output is added to the minimum margin angle reference values at the adders 17A, 17B to thereby produce the margin angle reference values. By such control of the margin angle reference values, the reactive power is properly controlled.

It is of course to be understood that the reactive power of the AC power system 6A is detected when the reactive power of the AC power system 6A is controlled, while the reactive power of the AC power system 6B is detected when the reactive power of the AC power system 6B is controlled. When the converter 1A is operating as a rectifier and the reactive power of the AC power system 6A is to be controlled, control over the margin angle of the converter 1B by the output of the reactive power control circuit 48 will lead to variation in the control angle of the converter 1A, so that the reactive power of the AC power system 6A is controlled.

Assume that a fault has occurred in the AC power system 6B and the voltage of the AC power system 6B has substantially fallen. Assume that nothing is done upon the occurrence of the fault as in a conventional control system. At that time the converter 1B, being a separately excited converter, becomes unable to perform commutation. For this reason valves connected to the same arms of the converter 1B are made to conduct upon fault and normal operation is resumed upon recovery. The occurrence of a fault and the recovery are detected by an AC under-voltage relay or the like. The above-described operation to render conductive the valves connected to the same arms is called a bypass pair (hereinafter referred to simply as BPP) operation.

During the BPP operation, the DC voltage of the converter is zero and only the DC current is flowing, so that only the reactive power is being consumed. As a result, the sound AC power system 6A in which no fault is present is affected. If the AC power system 6A is strong or if the ratio of the short-circuit capacity of the AC power system 6A to the capacity of the converter is large, the problem is not very serious. If, however, the ratio is small, a substantial voltage variation occurs in the AC power system 6A and a system breakdown of the AC power system 6A may occur.

To avoid the voltage variation upon occurrence of a fault, there are provided AC voltage detectors 51A, 51B which detect the voltages of the AC power systems 6A, 6B. The voltage detection signals from the detectors 51A, 51B and voltage reference values from voltage setting devices 52A, 52B are applied to adders 53A, 53B which produce the differences between the two inputs. The differences are fed to constant voltage control circuits 54A, 54B which are control amplifiers and their output signals are applied through switches 55A, 55B to the adders 23A, 23B. The outputs of the adders 23A, 23B form the current reference values for the constant current control circuits 13A, 13B. Each of the switches 55A, 55B is closed when the associated power system 6A or 6B is healthy and the opposite power system 6B or 6A is faulty. The switch 50 is opened when a fault occurs in either of the power systems 6A and 6B.

Assume that a three-phase grounding fault has occurred in the AC power system 6B. The fault is detected by an under-voltage relay 9A or 9B whereupon the switch 55A is closed and the switch 50 is opened.

The output signal 54Ay of the constant voltage control circuit 54A varies in such a manner as to maintain the voltage of the sound AC power system 6A at a predetermined value. The value becomes the current reference value for the constant current control circuit 13A, so that the DC current is controlled responsive to the voltage variation in the sound AC power system 6A. Consequently, the reactive power of the AC power system is controlled by the converter 1A. If the voltage of the sound AC power system 6A is excessive, the constant voltage control circuit 54A tends to increase the DC current, i.e., to increase consumption of the reactive power by the converter 1A so as to reduce the voltage. When the voltage of the sound AC power system 6A is low, the DC current is decreased, and hence the consumption of the reactive power by the converter 1A is decreased so that the voltage is increased. The variation in the AC voltage is approximately equal to the product of the variation in the reactive power and the reactance component of the AC power system. This is the reason why the control over the reactive power leads to control over the AC voltage.

If a fault occurs in the AC power system 6A, the switch 55B is closed and the switch 50 is opened, so that the voltage control is effected over the sound AC power system 6B.

In the above-described embodiment, the output of the constant reactive power control circuit 48 is added to the minimum margin angle reference values from the respective minimum margin angle setting devices 18A, 18B. But the members 45–48 may be omitted and the arrangement may alternatively be such that outputs of a margin angle setting devices 18A, 18B alone are applied to the constant margin angle control circuits 13A, 13B.

In the embodiment of FIG. 1, the voltage of the sound AC power system is detected and the DC current is controlled to minimize the voltage variation in the sound AC power system. But where constant reactive power control is effected, the output of the constant reactive power control circuit 48 may be used to control the DC current. A high speed type constant reactive power control circuit is preferably used since the control of the voltage of the AC power system requires a high speed.

Figure 2:
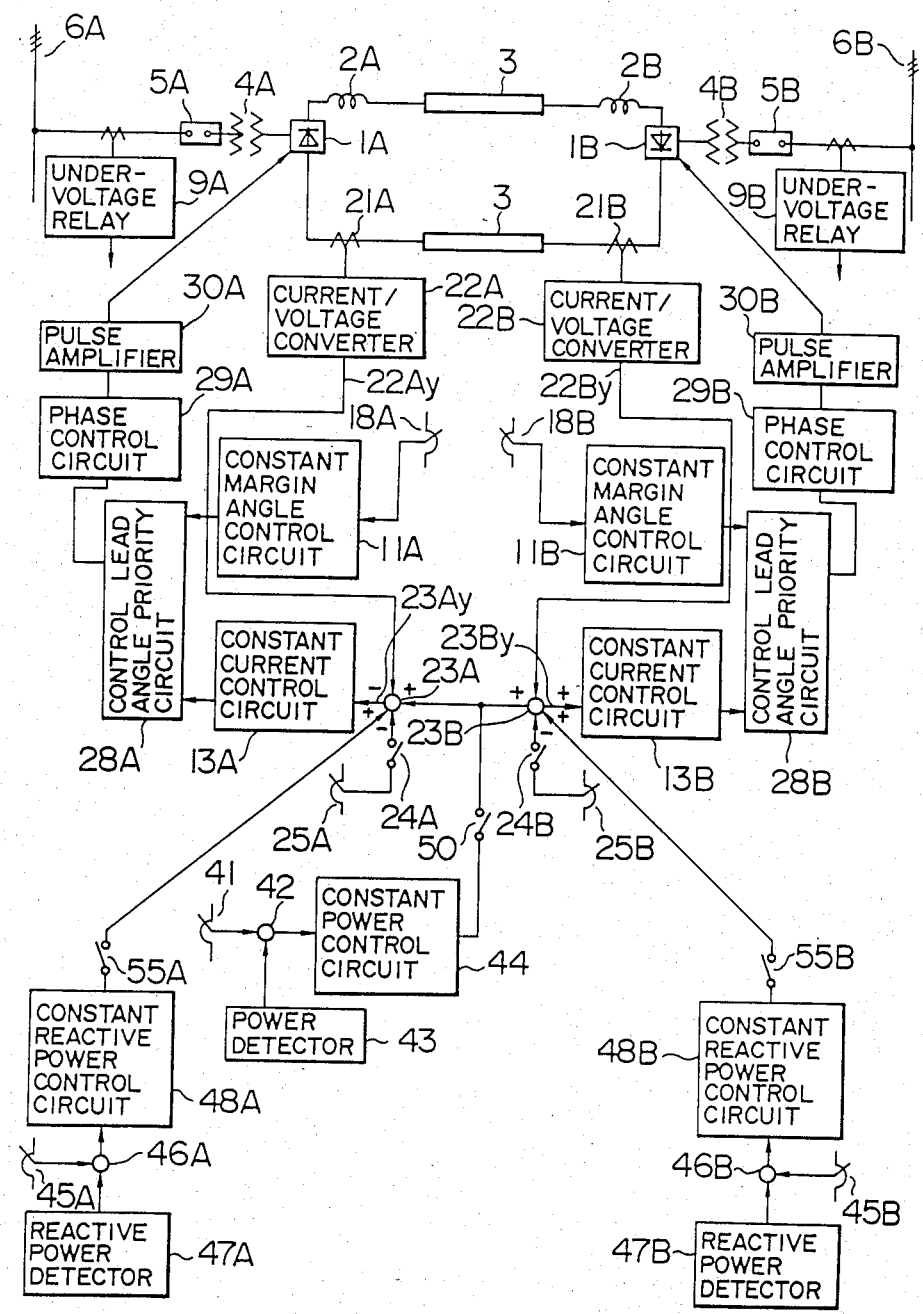
FIG. 2 is a block diagram showing another embodiment of the invention.

FIG. 2 shows another embodiment of the invention. In this embodiment, the members 45–48 as well as adders 17A, 17B of FIG. 1 are omitted, and the outputs of the margin angle setting devices 18A, 18B are directly applied to constant margin angle control circuits 11A, 11B. Moreover, reactive power setting devices 45A, 45B, adders 46A, 46B, reactive power detectors 47A, 47B, and constant reactive power control circuits 48A, 48B which are respectively similar to the members 45, 46, 47 and 48 are provided in association with the converters 1A, 1B. The detector 47A is provided to detect the reactive power of the AC power system 6A, while the detector 47B is provided to detect the reactive power of the AC power system 6B. The outputs of the control circuits 48A, 48B are applied via the switches 55A, 55B to the adders 23A, 23B. The rest of the arrangement is similar to that of FIG. 1.

In the embodiment of FIG. 2, the voltage of the sound AC power system is controlled through adjustment of the reactive power.

If the BPP operation is conducted in the converter connected to the faulty power system, the arrangement may be such that the DC current is prevented from exceeding a predetermined value while the system is faulty. The reason is that if the DC current of 100% of the rating continues to flow for more than a certain time period through the same valve, that valve may be damaged.

As has been described, according to the invention, where an AC-DC converter system is connected to a weak AC power system, and when a fault occurs in one of the AC power systems, and the converter connected to the faulty power system is incapable of operation, the DC current or the reactive power is controlled so as to restrain voltage variation in the sound AC power system, so that adverse effect on the sound AC power system is minimized and stable operation of the AC-DC power converter system is ensured.

What is claimed is:

1. A method for controlling an AC-DC converter system including a plurality of AC-DC converters having respective AC terminals connected to separate ones of a plurality of AC power systems and having respective DC terminals connected to each other, comprising the steps of:
    detecting a fault in any one of said plurality of AC power systems; and
    adjusting, when a fault occurs in a faulty one of the plurality of AC power systems, the DC current of the AC-DC converter which is connected to a sound AC power system of said plurality of power systems in such a manner as to maintain the AC voltage of the AC-DC converter which is connected to said sound AC power system at a desired value.

2. A method of claim 1, further comprising the step of performing a constant power control over the plurality of AC-DC converters when there is no fault in any one of said plurality of AC power systems.

3. A method according to claim 1, wherein, when the fault is detected, performing a bypass-pair operation in the AC-DC converter connected to the faulty AC power system.

4. A method according to claim 1, further comprising the step of preventing the DC current of the AC-DC converter connected to the sound AC power system from exceeding a predetermined value.

5. A system for controlling an AC-DC converter system including AC-DC converters having respective AC terminals connected to AC electric power systems and having respective DC terminals connected to each other, comprising:
    means for detecting a fault in the AC power system;
    a constant power control circuit providing a first current reference value;
    means for providing a second current reference value for performing control to maintain the voltage of the AC power systems at a desired value;
    constant current control circuits respectively providing signals indicative of the control angles of the AC-DC converters;
    means for selectively applying the first and second current reference values to the constant current control circuits;
    said selectively applying means applying the first current reference value when the AC power systems are sound, and applying the second current reference value when a fault occurs in any one of the power systems; and
    the constant current control circuits being responsive to the first current reference value for controlling the AC-DC converters to maintain the interchanged power at a desired value when the AC power systems are sound, and responsive to the second current reference value to maintain at a desired value the AC voltage of the AC-DC converter which is connected to the sound AC power system when a fault occurs in the other AC power system.

6. A system of claim 5, wherein said means for providing the second current reference value comprises a constant voltage control circuit.

7. A system of claim 5, wherein said means for providing the second current reference value comprises a constant reactive power control circuit, the second current reference value provided by the constant reactive power control circuit being determined to maintain the reactive power supplied to the AC-DC converter at a value to maintain the AC voltage of the AC-DC converter at the desired value.

* * * * *